US012332398B1

(12) United States Patent
Xiao et al.

(10) Patent No.: US 12,332,398 B1
(45) Date of Patent: Jun. 17, 2025

(54) PORE PRESSURE PREDICTION METHOD AND SYSTEM FOR FINE-GRAINED HYBRID SEDIMENTARY ROCK BASED ON VARIABLE P-WAVE VELOCITY

(71) Applicant: China University of Petroleum (East China), Qingdao (CN)

(72) Inventors: Dianshi Xiao, Qingdao (CN); Rui Wang, Qingdao (CN); Min Wang, Qingdao (CN); Zhuo Li, Qingdao (CN); Yingjie Liu, Qingdao (CN); Xian Shi, Qingdao (CN)

(73) Assignee: China University of Petroleum (East China), Qingdao (CN)

( * ) Notice: Subject to any disclaimer, the term of this patent is extended or adjusted under 35 U.S.C. 154(b) by 0 days.

(21) Appl. No.: 18/969,321

(22) Filed: Dec. 5, 2024

(30) Foreign Application Priority Data

Feb. 28, 2024 (CN) .......................... 202410217006.8

(51) Int. Cl.
*G01V 11/00* (2006.01)
(52) U.S. Cl.
CPC .................................. *G01V 11/002* (2013.01)
(58) Field of Classification Search
CPC .................................................... G01V 11/002
See application file for complete search history.

(56) References Cited

U.S. PATENT DOCUMENTS

2011/0015907 A1* 1/2011 Crawford ............... G01V 99/00
703/2

OTHER PUBLICATIONS

Bowers, Glenn L.. "Pore Pressure Estimation From Velocity Data: Accounting for Overpressure Mechanisms Besides Undercompaction." SPE Drill & Compl 10 (Year: 1995).*
Jincai Zhang, Effective stress, porosity, velocity and abnormal pore pressure prediction accounting for compaction disequilibrium and unloading, Marine and Petroleum Geology, vol. 45 (Year: 2013).*
Farsi, M., Mohamadian, N., Ghorbani, H et al. Predicting Formation Pore-Pressure from Well-Log Data with Hybrid Machine-Learning Optimization Algorithms. Nat Resour Res 30, 3455-3481 (2021) (Year: 2021).*

* cited by examiner

Primary Examiner — Michael J Dalbo
(74) Attorney, Agent, or Firm — Bayramoglu Law Offices LLC

(57) ABSTRACT

A pore pressure prediction method for fine-grained hybrid sedimentary rock based on variable P-wave velocity includes: carrying out a P-wave velocity test of rock under different effective stresses, determining a function form of the relationship between acoustic velocity and effective stress, fitting the parameters in the function by optimization, and establishing an evaluation model of effective stress influence term by lithology. According to the measured formation pressure data and the effective stress influence term model, the acoustic velocity background value is deduced, the logging curve is preferred, and the acoustic velocity background value logging evaluation model is established. According to the logging curves of DT and DEN, combined with the lithology identification results, the acoustic velocity background value is calculated, and then the effective stress of the formation is obtained, and then the pore pressure is determined according to the overburden pressure.

5 Claims, 9 Drawing Sheets

PORE PRESSURE PREDICTION METHOD AND SYSTEM FOR FINE-GRAINED HYBRID SEDIMENTARY ROCK BASED ON VARIABLE P-WAVE VELOCITY

CROSS REFERENCE TO THE RELATED APPLICATIONS

This application is based upon and claims priority to Chinese Patent Application No. 202410217006.8, filed on Feb. 28, 2024, the entire contents of which are incorporated herein by reference.

TECHNICAL FIELD

The present invention belongs to the field of pore pressure prediction technology for unconventional oil and gas reservoirs, especially relates to a pore pressure prediction method and system for fine-grained hybrid sedimentary rock based on variable P-wave velocity.

BACKGROUND

At present, the closest existing technology:

pore pressure is the stress borne by the formation pore fluid, which runs through the whole field of oil and gas exploration and development, it is necessary to determine the formation pore pressure especially in the drilling process, fracturing construction, and oil and gas field exploitation process. Overpressure occurs in the formation when the pore pressure is higher than the hydrostatic pressure. If the overpressure cannot be accurately predicted before drilling and during drilling, it will seriously affect the wellbore stability.

Logging curves are often used to predict pore pressure, the basic step is to establish an effective stress evaluation model according to the logging curves, and then calculate the pore pressure combined with the overburden pressure. P-wave velocity is sensitive to the effective stress of rock. In practical applications, P-wave is often used to predict the effective stress of rock, There are two main methods for achieving this: one is to establish a normal compaction trend line of acoustic, and calculate the effective stress of formation according to a ratio of measured acoustic to normal compaction trend value, such as Millers and Eaton method; another one is to establish a functional relationship between P-wave and effective stress, and calculate the effective stress, such as Bowers method, the method is considered that the relationship between P-wave velocity and effective stress satisfies the power function relationship.

The above existing pore pressure prediction models are mostly for shale formation, and the causes of overpressure are relatively simple, it can achieve better application results by using the logging parameters related to porosity (acoustic logging, resistivity, etc.) to predict pore pressure. Fine-grained hybrid sedimentary rock is a product of the combined action of terrigenous debris, chemical deposition and volcanism, its particle size is usually less than 62.5 μm, which is an important reservoirs of mixed shale oil. For fine-grained hybrid sedimentary rock reservoirs, it has the following characteristics: 1) lithological diversity, including shale, siltstone, carbonate rocks, and their transitional lithology, and overpressure is common in fine-grained hybrid sedimentary rocks, the formation mechanism of abnormal pore pressure is complex, the causes of overpressure include unbalanced compaction and hydrocarbon generation pressurization, and it is difficult to establish a normal compaction trend line; 2) the rock components such as organic matter and dolomite seriously affect the acoustic logging and resistivity logging, the difference between different lithologies is large, which will confuse the response of overpressure phenomenon in logging curves, meanwhile, the relationship between P-wave and effective stress of fine-grained hybrid sedimentary rock do not all meet the single power function change form. Therefore, the conventional pore pressure prediction method cannot be effectively applied to fine-grained hybrid sedimentary rock reservoirs, and it is urgent to propose a new pore pressure prediction method for fine-grained hybrid sedimentary rock reservoirs.

In summary, the problems of the existing technology are:
(1) the lithology of fine-grained hybrid sedimentary rock reservoir is complex, there are differences in mineral composition and organic carbon content among different lithologies, and there are differences in the skeleton response values among acoustic and density logging curves of various lithologies, if the different influence of rock skeletons on acoustic and density response is not considered, the prediction accuracy of pore pressure will be reduced by carrying out effective stress prediction according to the same background value or establishing trend line.
(2) The relationship between P-wave velocity and effective stress of different types of fine-grained hybrid sedimentary rock is not uniform, the P-wave velocity of mud-grade hybrid sedimentary rock shows a stable power function form after increasing in a single stage with the increase of effective stress, while the sand-grade hybrid sedimentary rock shows a double-stage increasing form, the calculation accuracy of pore pressure will be affected if the effective stress is predicted according to a single function form.

The difficulty of solving the above technical problems:
there are two difficulties in this technical method: establishing an effective stress influence term prediction model according to the complex lithology of fine-grained hybrid sedimentary rock and establishing a logging evaluation model of acoustic velocity background value $V_0$. The skeleton-supported types in fine-grained hybrid sedimentary rock will affect the deformation process of rock, and also affect the change mode of P-wave velocity with effective stress. Therefore, the relationship between acoustic velocity and effective stress is no longer a single function, and it is necessary to determine the effective stress influence term prediction model according to lithological changes. In addition, the P-wave background value changes obviously with the mineral composition, organic matter content, and porosity, the formation pressure calculated by the fixed acoustic velocity background value $V_0$ will also introduce immeasurable errors, so it is necessary to establish an effective acoustic velocity background value $V_0$ logging evaluation model to improve the prediction accuracy of pore pressure.

SUMMARY

In view of the problems existing in the existing technology, the present invention provides a pore pressure prediction method for fine-grained hybrid sedimentary rock based on variable P-wave velocity.

The present invention also provides a pore pressure prediction system for fine-grained hybrid sedimentary rock based on variable P-wave velocity.

The technical scheme of the present invention is as follows:
a pore pressure prediction method for fine-grained hybrid sedimentary rock based on variable P-wave velocity, including:
determining a functional relationship between a variable P-wave velocity and effective stress;
establishing an effective stress influence term prediction model;
establishing a logging evaluation model of a P-wave background value;
predicting pore pressure of a variable acoustic velocity background value.

Preferably according to the present invention, the function relationship between the P-wave velocity and the effective stress is determined; including:
carrying out a core sampling of fine-grained hybrid sedimentary rock formation, and carrying out an effective stress and P-wave velocity test to measure a change of P-wave velocity of rock under different effective stresses, analyzing the functional relationship between the P-wave velocity and effective stress according to an intersection diagram of P-wave velocity and effective stress, and determining a functional relationship for two types, including reservoirs mud-grade hybrid sedimentary rock and sand-grade hybrid sedimentary reservoir respectively.

Further, the fine-grained hybrid sedimentary rocks in the study area are sampled when the effective stress and P-wave velocity tests are carried out, the sample covers a main lithology, and the sample is a regular cylinder; the P-wave velocity test is carried out on the sample under different effective stresses, and a change curve of the P-wave velocity of the rock with the effective stress is established, and an effective stress point is set uniformly.

Further, when determining a functional relationship between the P-wave velocity and the effective stress, a scatter diagram of the change of the acoustic velocity of each sample with the effective stress is counted respectively, and the relationship between the P-wave velocity and the effective stress of different lithologic samples is observed;

for sand-grade hybrid sedimentary reservoir, a function relationship between P-wave velocity and effective stress is fitted by a power function+S function: power function+S function is shown in Equation (1):

$$Vp = V_0 + A\sigma^B + \frac{C}{1+\left(\frac{D}{\sigma}\right)^E} = V_0 + f_2(\sigma) \quad (1)$$

for mud-grade hybrid sedimentary rock, the function relationship between P-wave velocity and effective stress is denoted by a power function; the power function is shown in Equation (2):

$$Vp = V_0 + A\sigma^B = V_0 + f_1(\sigma) \quad (2)$$

where, Vp is a P-wave velocity of rock, m/s; $V_0$ is an acoustic velocity background value, m/s; $\sigma$ is an effective stress, MPa; A, B, C, D, and E are parameter variables, which are obtained by fitting; $f_1$ and $f_2$ are an effective stress influence items of mud-grade hybrid sedimentary rock and sand-grade hybrid sedimentary reservoir, respectively.

Preferably according to the present invention, the effective stress influence term prediction model is established; including:
based on the measured data of P-wave velocity and effective stress of core, using an optimization method to predict parameters A and B in the power function and parameters A, B, C, D and E in the power function+S function respectively by dividing into the mud-grade hybrid sedimentary rock and sand-grade hybrid sedimentary reservoir, and obtaining effective stress influence term function $f_1(\sigma)$ and $f_2(\sigma)$ of mud-grade hybrid sedimentary rock and sand-grade hybrid sedimentary reservoir respectively.

Preferably according to the present invention, the logging evaluation model of the acoustic velocity background value is established; including:
combining with measured pore pressure data of fine-grained hybrid sedimentary rock formation in a work area to calculate the effective stress influence term value, then, deducing an acoustic velocity background value by using an acoustic logging curve of the measured pore pressure corresponding to a depth point;
counting a relationship between acoustic velocity background value and a neutron curve, a density curve, an acoustic logging curve, a resistivity curve, a natural gamma ray curve and a buried depth, and establishing the logging evaluation model of acoustic velocity background value.

Further, when determining the acoustic velocity background value based on a measured formation pressure, according to an existing pore pressure test data Pp of a target layer in the work area, and combined with the density of overlying formation and buried depth, an overburden pressure G is calculated, and an effective stress value of the rock at a depth point $\sigma = G - Pp$ is calculated;
$f_1(\sigma)$ or $f_2(\sigma)$ is selected to calculate the effective stress influence term value according to lithology information corresponding to the depth point;
combined with the measured acoustic logging curve DT at this depth point, the P-wave velocity Vp is calculated, and the acoustic velocity background value $V_0 = Vp - f_1(\sigma)$ or $V_0 = Vp - f_2(\sigma)$ is obtained.

Further, when establishing the logging evaluation model of acoustic velocity background value, according to the determined acoustic velocity background value $V_0$, the logging curve values corresponding to the formation pore pressure test points are extracted, including the neutron logging curve, density curve, acoustic logging curve, resistivity curve, natural gamma ray curve and buried depth,
through a data correlation analysis method, a correlation coefficient and a correlation degree of the acoustic velocity background value $V_0$ with the buried depth and different logging curves which include neutron curve, density curve, acoustic logging curve, resistivity curve and natural gamma ray curve are analyzed, the parameter combination with the correlation coefficient of the acoustic velocity background value $V_0$ higher than 0.5 and the smaller correlation degree is preferably selected as a sensitive parameter combination, the acoustic velocity background value $V_0$ is taken as a dependent variable, and the preferred selected sensitive parameters are as independent variables, a logging evaluation model $F(V_0)$ of the acoustic velocity background value $V_0$ is established by a linear regression method.

Preferably according to the present invention, the pore pressure of a variable acoustic velocity background value is predicted; including:
based on the acoustic velocity background value $V_0$ and the effective stress influence term function $f_1(\sigma)$ or $f_2(\sigma)$, combined with a lithology logging identification method, calculating an effective stress value of the target layer by using the neutron curve, density curve, acoustic logging curve, resistivity curve, natural gamma ray curve and buried depth parameter, and then obtaining a pore pressure distribution curve, depicting a vertical and planar distribution of pore pressure, and realizing a prediction of pore pressure of variable acoustic velocity background value.

Further, when predicting the pore pressure of the variable acoustic velocity background value, the P-wave velocity Vp and the overburden pressure G are calculated by inputting the existing logging curves which include neutron, density, resistivity and acoustic logging, and an effective stress $\sigma$ of the formation is calculated by the logging evaluation model $F(V_0)$ and the effective stress influence term model of the acoustic velocity background value $V_0$, and then a pore pressure curve Pp is obtained;

the pore pressure is shown in Equation (3):

$$Pp = G - \sigma = \rho g h - \sigma \qquad (3).$$

where g is the gravitational acceleration equal to 32.2 ft/s²
the effective stress influence term is shown in Equation (4):

$$f(\sigma) = V_p - V_0 = \frac{10^6}{DT} - F(DT, DEN, h, \ldots) \qquad (4)$$

where Pp is a pore pressure, MPa; G is an overburden pressure, MPa; $\rho$ is a density of overlying formation, g/cm³; h is a buried depth, km; $\sigma$ is effective stress, MPa, which is calculated by f ($\sigma$) function inversion; Vp is a P-wave velocity, m/s, which is calculated by the acoustic logging curve DT; DT is an acoustic logging curve, μs/m; F (DT, DEN, h, . . . ) denotes an acoustic velocity background value function; DEN is a density curve.

A computer device, the computer device includes memory and a processor, the memory stores a computer program, and the processor executes the computer program to implement steps of the pore pressure prediction method for fine-grained hybrid sedimentary rock based on variable P-wave velocity.

A computer-readable storage medium, a computer program is stored on the computer-readable storage medium, and steps of the pore pressure prediction method for fine-grained hybrid sedimentary rock based on variable P-wave velocity are implemented when the computer program is executed by the processor.

A pore pressure prediction system for fine-grained hybrid sedimentary rock based on variable P-wave velocity, including:
a determining module for the functional relationship between the P-wave velocity and the effective stress is configured as: determining the functional relationship between the P-wave velocity and the effective stress;
an establishment module for the effective stress influence term prediction model is configured as: establishing the effective stress influence term prediction model;
an establishment module for logging evaluation model of P-wave background value is configured as: establishing logging evaluation model of P-wave background value;
a prediction module is configured as: predicting the pore pressure of the variable acoustic velocity background value.

In summary, the advantages and positive effects of the present invention are:

The present invention provides a new pore pressure prediction method and system for fine-grained hybrid sedimentary rock based on variable P-wave velocity. This method can predict the abnormal pore pressure distribution of fine-grained hybrid sedimentary rock formation caused by various mechanisms such as unbalanced compaction and hydrocarbon generation. If the overpressure cannot be accurately predicted before drilling and during drilling, it will seriously affect the stability of the wellbore and may even lead to drilling accidents such as well kick, blowout, and fluid inflow. Meanwhile, the efficiency of oil and gas exploitation and the production of oil and gas layers will also be affected by pore pressure. Therefore, accurate prediction of pore pressure is very important for oil and gas exploration and development. The conventional Eaton or Bowers pore pressure prediction models make it difficult to accurately depict the pore pressure of fine-grained hybrid sedimentary rock formation due to constraints such as the complex lithology of fine-grained hybrid sedimentary rock and the great influence of lithology on the skeleton background values such as velocity and density. The present invention greatly improves the accuracy of pore pressure prediction of fine-grained hybrid sedimentary rock reservoir and provides technical support for sweet spot optimization of fine-grained hybrid sedimentary rock reservoir and pressure prediction in the drilling process by introducing the difference of effective stress-acoustic velocity change of different lithologies and the variable acoustic velocity background value $V_0$. Focusing on the characteristics of fine-grained hybrid sedimentary rock reservoirs, a new pore pressure prediction method that considers the change form of acoustic velocity-effective stress and the change of acoustic velocity background value of fine-grained hybrid sedimentary rock is constructed, which improves the accuracy of pore pressure prediction of fine-grained hybrid sedimentary rock reservoirs, and provides technical support for the evaluation of hybrid sedimentary shale oil sweet spot and pressure prediction during drilling. The logging curve of the present invention has a high vertical resolution and can continuously depict the pore pressure distribution, which can effectively make up for the disadvantages of limited measured formation pressure test data, high test cost and inability to continuously depict the pore pressure distribution of fine-grained mixed rock reservoirs.

DETAILED DESCRIPTION OF THE EMBODIMENTS

In order to make the objective, technical solution and advantages of the present invention clearer and more specific, the present invention will be further described in detail bellow with reference to embodiments. It should be understood that the specific embodiments described herein are merely illustrative of the present invention and are not intended to limit the present invention.

Embodiment 1

Figure 1:
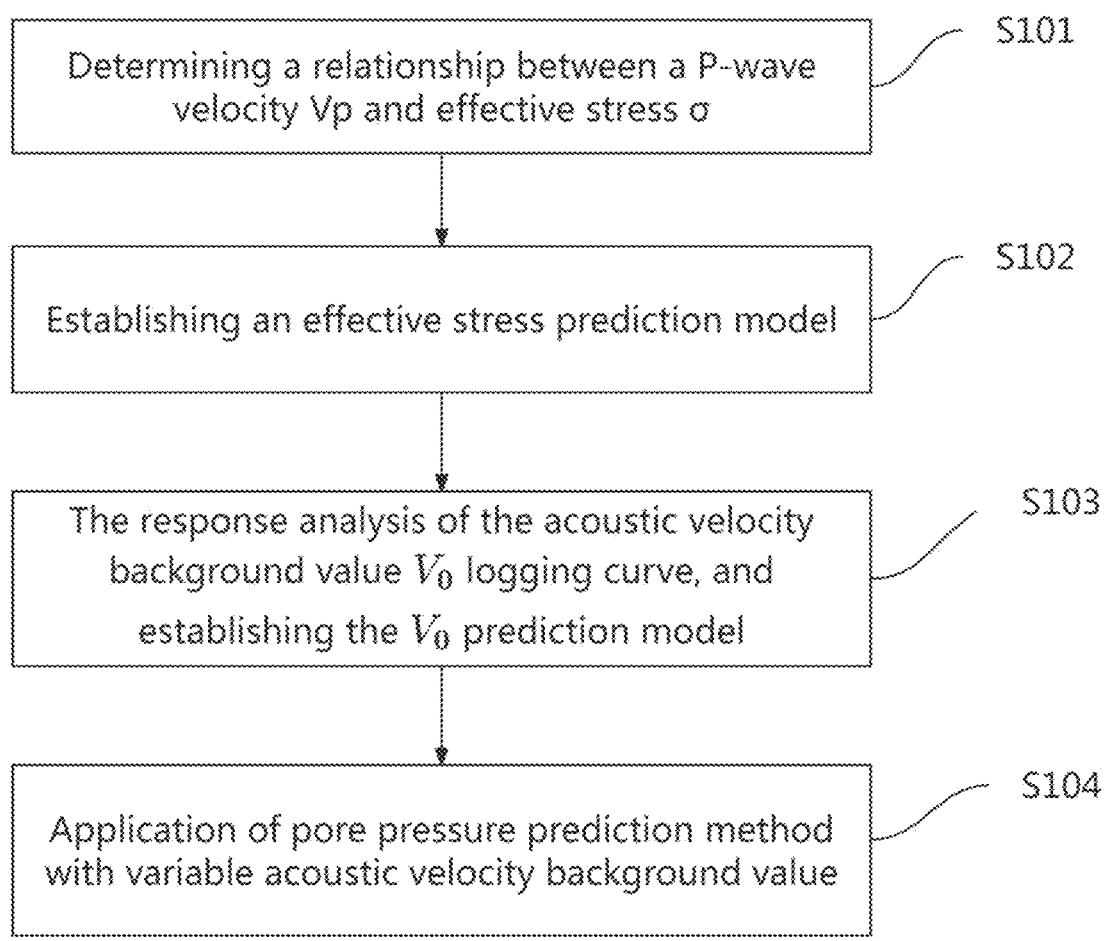
FIG. 1 is a schematic flow diagram of a pore pressure prediction method for fine-grained hybrid sedimentary rock based on variable P-wave velocity according to an embodiment of the present invention.

As shown in FIG. 1, a pore pressure prediction method for fine-grained hybrid sedimentary rock based on variable P-wave velocity, including:
S101: a functional relationship between a P-wave velocity Vp and effective stress σ is determined;
S102: an effective stress influence term prediction model f (G) is established;
S103: a logging evaluation model of an acoustic velocity background value $V_0$ is established;
S104: pore pressure of a variable acoustic velocity background value is predicted.

Embodiment 2

According to the pore pressure prediction method for fine-grained hybrid sedimentary rock based on variable P-wave velocity of embodiment 1, the difference is:
the functional relationship between a P-wave velocity Vp and effective stress σ is determined, including:
a core sampling of fine-grained hybrid sedimentary rock formation is carried out, and according to GB/T 50266-2013 Standard for test methods of engineering rock mass, the effective stress and P-wave velocity test are carried out to measure a change of P-wave velocity Vp of rock under different effective stresses σ, the functional relationship between the two are analyzed according to an intersection diagram of Vp and σ, and a functional relationship for two types of reservoirs which include mud-grade hybrid sedimentary rock and sand-grade hybrid sedimentary reservoir is determined respectively.

The fine-grained hybrid sedimentary rocks in the study area are sampled when the effective stress and P-wave velocity tests are carried out, the sample covers a main lithology (such as shale, siltstone, carbonate rock, and dolomitic siltstone, etc.), and the sample is a regular cylinder (5 cm in length and 2.5 cm in diameter); the P-wave velocity test is carried out on the sample under different effective stresses, and a change curve of the P-wave velocity of the rock with the effective stress is established, the change range of the effective stress point needs to refer to the effective stress distribution of the actual formation, and the effective stress point is set as uniform as possible.

When determining a functional relationship between the P-wave velocity and the effective stress, a scatter diagram of the change of the acoustic velocity of each sample with the effective stress is counted respectively, and the relationship between the P-wave velocity and the effective stress of different lithologic samples is observed;

for sand-grade hybrid sedimentary reservoir (such as siltstone, sandy dolomite, dolomite siltstone, etc.), the function relationship between P-wave velocity and effective stress is fitted by power function+S function: in this model, the change of P-wave velocity is composed of three parts, the first item is the background value, the second item reflects the change of P-wave velocity caused by the deformation of the hard skeleton, which satisfies the power function form, and the third item is the velocity change caused by the deformation of the soft grain skeleton, which conforms to the S-type function; the power function+S function is shown in Equation (1):

$$Vp = V_0 + A\sigma^B + \frac{C}{1+\left(\frac{D}{\sigma}\right)^E} = V_0 + f_2(\sigma) \tag{1}$$

for single-skeleton rocks such as mud-grade hybrid sedimentary reservoir (such as mudstone, micritic dolomite), the rock deforms under smaller effective stress due to the lack of support and protection of the hard skeleton, so the S-function term is missing, the function relationship between P-wave velocity and effective stress is denoted by power function; the power function is shown in Equation (2):

$$Vp = V_0 + A\sigma^B = V_0 + f_1(\sigma) \tag{2}$$

where, Vp is a P-wave velocity of rock, m/s; $V_0$ is an acoustic velocity background value, m/s; σ is an effective stress, MPa; A, B, C, D, and E are parameter variables, which are obtained by fitting; $f_1$ and $f_2$ are an effective stress influence items of mud-grade hybrid sedimentary rock and sand-grade hybrid sedimentary reservoir, respectively.

An effective stress influence term prediction model f(σ) is established; including:
based on the measured data of P-wave velocity and effective stress of core, an optimization method is used to predict parameters A and B in the power function and parameters A, B, C, D and E in the power function+S function respectively by dividing into the mud-grade hybrid sedimentary rock and sand-grade hybrid sedimentary reservoir, and effective stress influence term function $f_1(\sigma)$ and $f_2(\sigma)$ of mud-grade hybrid sedimentary rock and sand-grade hybrid sedimentary reservoir are obtained respectively.

The logging evaluation model of the acoustic velocity background value $V_0$ is established; including:
combined with measured pore pressure data of fine-grained hybrid sedimentary rock formation in a work area to calculate the effective stress influence term value, then, an acoustic velocity background value $V_0$ is deduced by using an acoustic logging curve of the measured pore pressure corresponding to a depth point; a relationship between acoustic velocity background value and a neutron curve (CNL), a density curve (DEN), an acoustic logging curve (DT), a resistivity curve (RT), a natural gamma ray curve (GR), and a buried depth is counted, and the logging evaluation model of acoustic velocity background value is established.

When determining the acoustic velocity background value based on a measured formation pressure, according to an existing pore pressure test data Pp of a target layer in the work area, and combined with the density of overlying formation and buried depth, an overburden pressure G is calculated, specifically: the overburden pressure G is calculated by the product of overburden density, gravity acceleration and buried depth; and an effective stress value of the rock at a depth point σ=G−Pp is calculated;

according to lithology information corresponding to the depth point, $f_1(\sigma)$ or $f_2(\sigma)$ is selected to calculate the effective stress influence term value;

combined with the measured acoustic logging curve DT at this depth point, the P-wave velocity Vp is calculated, specifically: the P-wave velocity Vp is the reciprocal of the acoustic logging curve DT, that is, the P-wave velocity Vp=1/DT; and the acoustic velocity background value $V_0$=Vp−$f_1(\sigma)$ (mud-grade hybrid sedimentary rock) or $V_0$=Vp−$f_2(\sigma)$ (sand-grade hybrid sedimentary reservoir) is obtained.

When establishing the logging evaluation model of acoustic velocity background value, according to the determined acoustic velocity background value $V_0$, the logging curve values corresponding to the formation pore pressure test points are extracted (the logging curve value is read from the existing logging curve series according to the selected depth point), including the neutron logging curve, density curve, acoustic logging curve, resistivity curve, natural gamma ray curve and buried depth, through a data correlation analysis method, a correlation coefficient and a correlation degree of the acoustic velocity background value $V_0$ with the buried depth and different logging curves which include neutron curve, density curve, acoustic logging curve, resistivity curve and natural gamma ray curve are analyzed, the parameter combination with the correlation coefficient of the acoustic velocity background value $V_0$ higher than 0.5 and the smaller correlation degree is preferably selected as a sensitive parameter combination, the acoustic velocity background value $V_0$ is taken as a dependent variable, and the preferred selected sensitive parameters are as independent variables, a logging evaluation model $F(V_0)$ of the acoustic velocity background value $V_0$ is established by a linear regression method.

The pore pressure of a variable acoustic velocity background value is predicted; including:

based on the acoustic velocity background value $V_0$ and the effective stress influence term function $f_1(\sigma)$ or $f_2(\sigma)$, combined with a lithology logging identification method, an effective stress value of the target layer is calculated by using the neutron curve, density curve, acoustic logging curve, resistivity curve, natural gamma ray curve and buried depth parameter, and then a pore pressure distribution curve is obtained, a vertical and planar distribution of pore pressure is depicted, and a prediction of pore pressure of variable acoustic velocity background value is realized.

When predicting the pore pressure of the variable acoustic velocity background value, the P-wave velocity Vp and the overburden pressure G are calculated by inputting the existing logging curves which include neutron, density, resistivity and acoustic logging, and an effective stress σ of the formation is calculated by the logging evaluation model $F(V_0)$ and the effective stress influence term model of the acoustic velocity background value $V_0$, and then a pore pressure curve Pp is obtained;

the pore pressure is shown in Equation (3):

$$Pp = G - \sigma = \rho g h - \sigma \qquad (3)$$

the effective stress influence term is shown in Equation (4):

$$f(\sigma) = V_p - V_0 = \frac{10^6}{DT} - F(DT, DEN, h, \ldots) \qquad (4)$$

where Pp is a pore pressure, MPa; G is an overburden pressure, MPa; ρ is a density of overlying formation, g/cm³; h is a buried depth, km; σ is effective stress, MPa, which is calculated by f(σ) function inversion; Vp is a P-wave velocity, m/s, which is calculated by the acoustic logging curve DT; DT is an acoustic logging curve, μs/m; F (DT, DEN, h, . . . ) denotes an acoustic velocity background value function; DEN is a density curve.

Embodiment 3

According to the pore pressure prediction method for fine-grained hybrid sedimentary rock based on variable P-wave velocity of embodiment 1, the difference is:

After years of exploration and development, the shale oil of the Lucaogou Formation in the Jimusaer Sag has been commercially developed, the embodiment takes two sets of sweet spots of the second member (upper sweet spot) and the first member (lower sweet spot) of the Lucaogou Formation in the Jimsaer Sag as examples to illustrate the specific steps of the embodiment of the present invention:

the pore pressure prediction method for fine-grained hybrid sedimentary rock based on variable P-wave velocity, including:

(1) the functional relationship between a P-wave velocity Vp and effective stress σ is determined;

the rock skeleton undergoes elastic deformation and the pores are compressed as the effective stress acting on the rock skeleton increases, which is equivalent to a decrease in porosity, and the P-wave velocity will increase significantly. Fine-grained hybrid sedimentary rocks develop a variety of mineral components and organic matter, minerals of different particle sizes and components are mixed with each other to form a variety of rock skeletons with different mechanical properties, leading to different responses of acoustic velocities of different lithologies to the changes of effective stress of rocks. Currently, the commonly used effective stress prediction model usually considers the relationship between effective stress and P-wave velocity is a single power function, and ignores the influence of lithology on the change of P-wave velocity.

Figure 2:
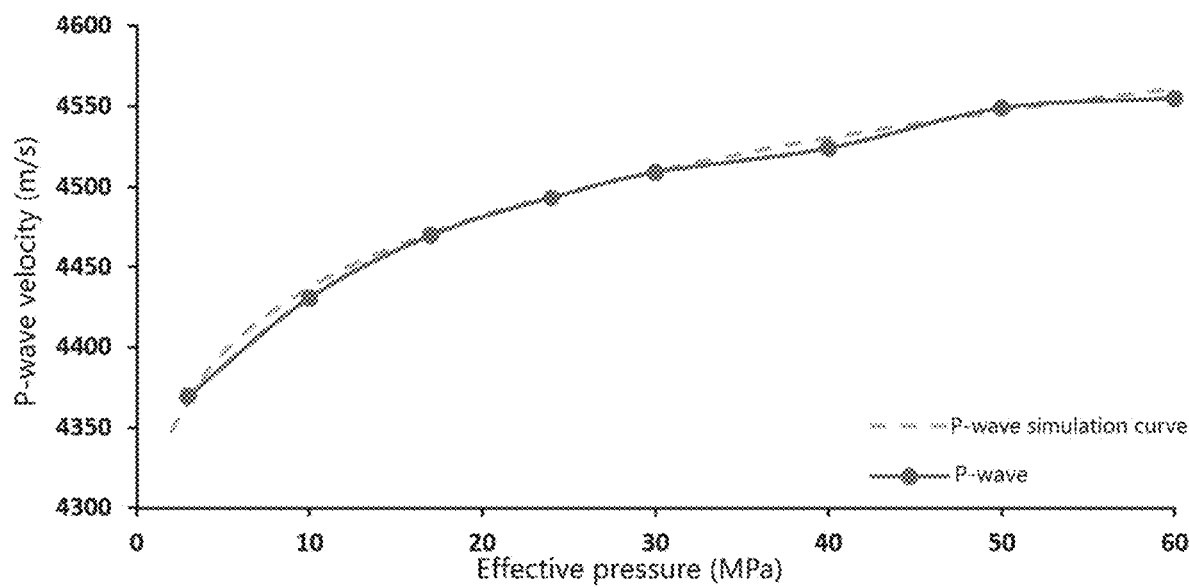
FIG. 2 is a schematic diagram of the relationship of example 1 between a P-wave velocity and effective stress of a mud-grade hybrid sedimentary rock according to an embodiment of the present invention.
Figure 3:
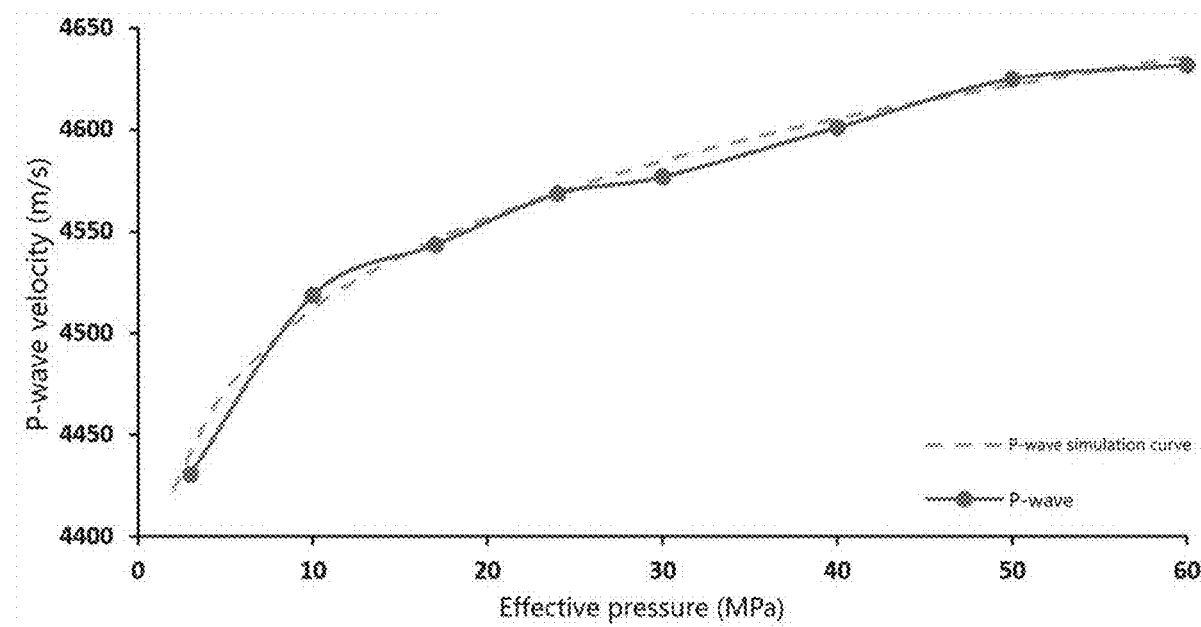
FIG. 3 is a schematic diagram of the relationship of example 2 between a P-wave velocity and effective stress of a mud-grade hybrid sedimentary rock according to an embodiment of the present invention.
Figure 4:
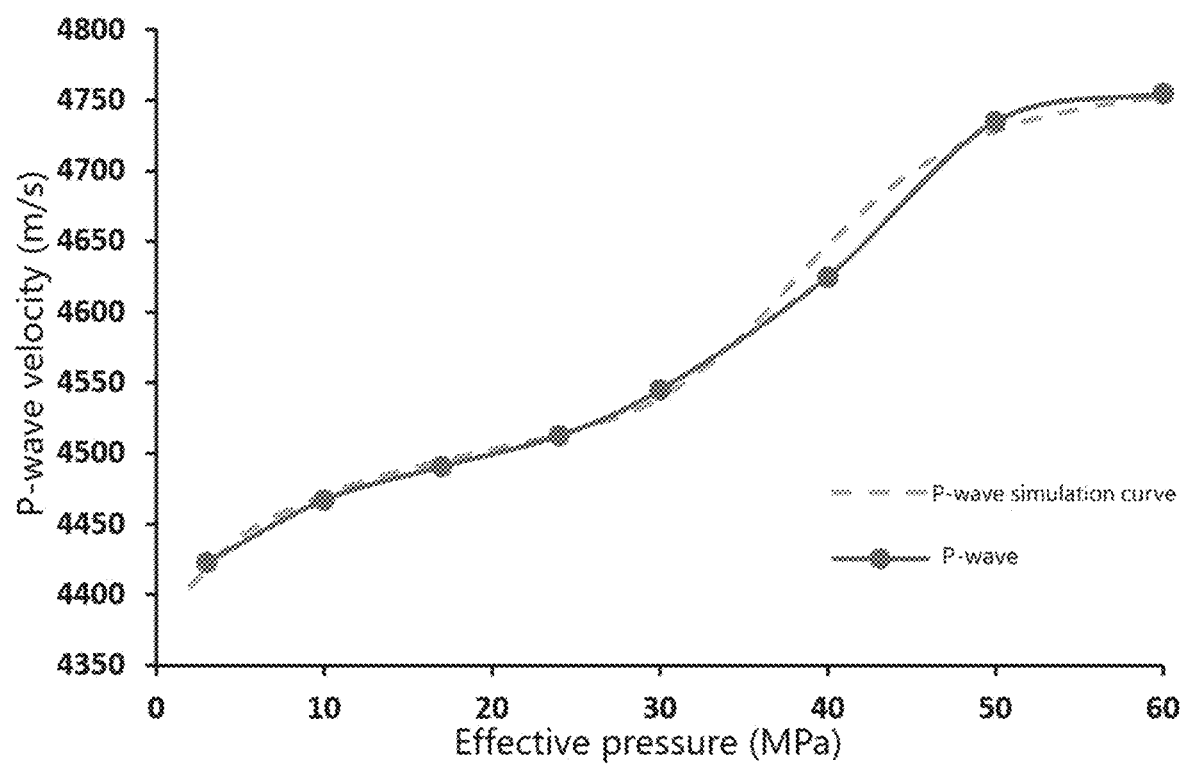
FIG. 4 is a schematic diagram of the relationship of example 1 between a P-wave velocity and an effective stress of a sand-grade hybrid sedimentary rock according to an embodiment of the present invention.
Figure 5:
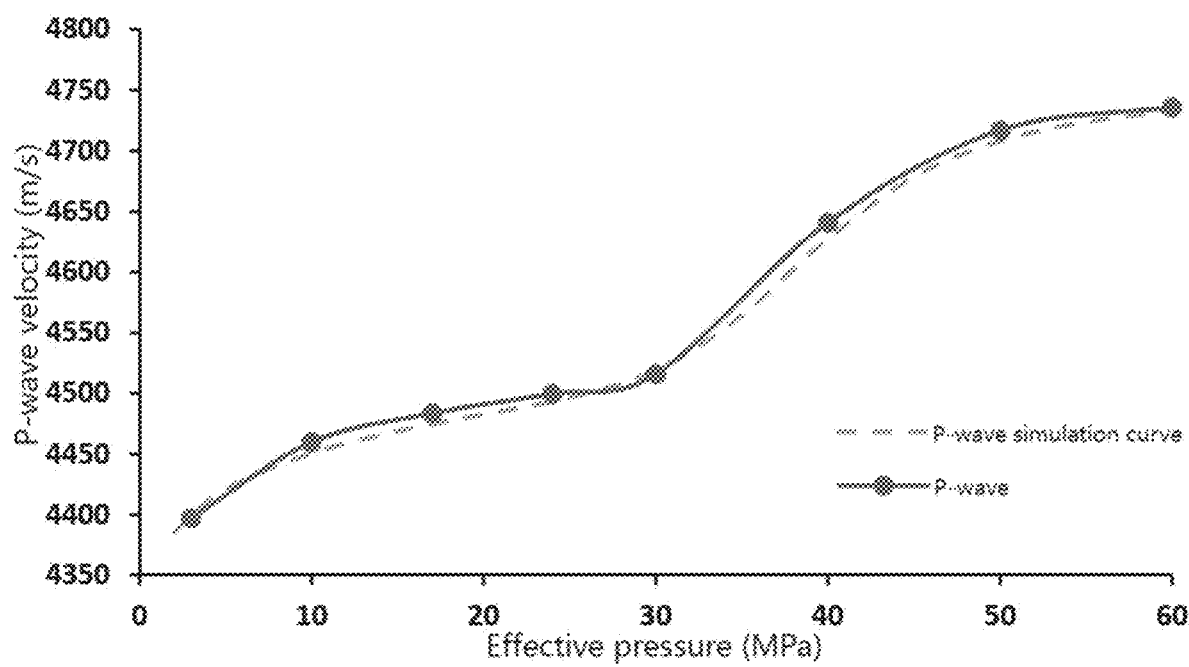
FIG. 5 is a schematic diagram of the relationship of example 2 between a P-wave velocity and effective stress of a sand-grade hybrid sedimentary rock according to an embodiment of the present invention.

The procedure for determining the functional relationship between a P-wave velocity Vp and effective stress σ is as follows:

1) no less than 10 core samples in the study area are collected to ensure that the samples can cover different lithologies (including mudstone, micritic dolomite, siltstone, sandy dolomite, and dolomite siltstone); the cores are drilled in parallel with the formation, and the cores are regular cylinders (5 cm in length and 2.5 cm in diameter). According to GB/T 50266-2013 Standard for test methods of engineering rock mass, the P-wave velocity test under different effective stresses is carried out, the buried depth of the study area is about 2000-5000 m, the change range of pore pressure coefficient is 1.3-1.6, and range of the effective stress distribution is about 20-60 MPa, a total of eight effective stress points are selected to carry out the test, and the maximum value is 60 MPa; the test results are shown in FIG. 2 and FIG. 3;

2) the functional relationship between a P-wave velocity $V_p$ and effective stress $\sigma$ is analyzed. The P-wave velocity of the measured samples increases with the increase of effective stress. For mud-grade hybrid sedimentary rocks, such as dolomitic mudstone, micritic dolomite, etc., the P-wave velocity first increases rapidly with the increase of effective stress, and the growth rate of P-wave velocity gradually slows down with the further increase of effective pressure (as shown in FIG. 2 and FIG. 3); sand-grade hybrid sedimentary rocks, such as siltstone, dolomitic siltstone, etc, when the effective stress is less than 30 MPa, the P-wave and the effective stress satisfy the single-stage power function increase, when the effective stress exceeds 30 Mpa, the P-wave velocity shows a second-stage power function change that increases rapidly and slows down (as shown in FIG. 4 and FIG. 5). It can be seen that the type of skeleton support in fine-grained hybrid sedimentary rock will affect the rock deformation process and also determine the change mode of P-wave velocity with effective stress, the P-wave velocity of mud-grade hybrid sedimentary rock shows a single power function change, and the sand-grade hybrid sedimentary rock shows a power function+S function change trend as a whole.

(2) an effective stress influence term prediction model $f(\sigma)$ is established;

for sand-grade hybrid sedimentary reservoir, the relationship between P-wave velocity and effective stress can be fitted by power function+S function: power function+S function is shown in Equation (1):

$$Vp = V_0 + A\sigma^B + \frac{C}{1+\left(\frac{D}{\sigma}\right)^E} = V_0 + f_2(\sigma) \quad (1)$$

where, $V_0$ is an acoustic velocity background value, m/s; $\sigma$ is an effective stress, MPa; A, B, C, D and E are parameter variables, which are obtained by fitting; $f_2$ is an effective stress influence items of sand-grade hybrid sedimentary reservoir.

For mud-grade hybrid sedimentary reservoir, the relationship between P-wave velocity and effective stress can be fitted by a single power function: the single-stage power function is shown in Equation (2):

$$Vp = V_0 + A\sigma^B = V_0 + f_1(\sigma) \quad (2)$$

where, $V_0$ is an acoustic velocity background value, m/s; $\sigma$ is an effective stress, MPa; A, and B are parameter variables, which are obtained by fitting; $f_1$ is an effective stress influence items of mud-grade hybrid sedimentary rock.

Based on the P-wave velocity-effective stress test data, the mud-grade hybrid sedimentary reservoir and the sand-grade hybrid sedimentary reservoir are divided, and the above functions are fitted by the optimization method respectively, the parameters fitting results of the P-wave velocity and the effective stress relationship model are shown in the following Table 1, and the fitting effect is shown in FIG. 2 and FIG. 3. The fitting accuracy of each sample is above 0.98, indicating that the above function form can reflect the change relationship between the P-wave velocity-effective stress of the fine-grained hybrid sedimentary rock.

According to the fitting parameters, the effective stress influence function $f_1(\sigma)$ and $f_2(\sigma)$ of mud-graded hybrid sedimentary reservoir and sand-graded hybrid sedimentary reservoir can be obtained:

$$f_1(\sigma) = 350\sigma^{0.13};$$

$$f_2(\sigma) = 350\sigma^{0.1} + \frac{200}{1+(39/\sigma)^9};$$

TABLE 1

| Sample number | Fitting accuracy $R^2$ | $V_0$ (m/s) | A | B | C | D | E |
|---|---|---|---|---|---|---|---|
| 8# | 0.9944 | 4030 | 350 | 0.1 | 200 | 39 | 9 |
| 13# | 0.9976 | 4010 | 350 | 0.1 | 200 | 39 | 9 |
| 26# | 0.9837 | 3180 | 350 | 0.1 | 200 | 39 | 9 |
| 31# | 0.9887 | 3810 | 350 | 0.1 | 200 | 39 | 9 |
| 21# | 0.9929 | 3180 | 350 | 0.1 | 200 | 39 | 9 |
| 41# | 0.9976 | 4280 | 350 | 0.1 | 200 | 39 | 9 |
| 10# | 0.9971 | 3965 | 350 | 0.13 | 0 | / | / |
| 46# | 0.9905 | 4040 | 350 | 0.13 | 0 | / | / |
| 43# | 0.9882 | 4675 | 350 | 0.13 | 0 | / | / |
| 54# | 0.9922 | 4170 | 350 | 0.13 | 0 | / | / |

(3) A logging evaluation model of an acoustic velocity background value $V_0$ is established;

after fitting the experimental data of P-wave velocity and effective stress (Table 1), the change range of acoustic velocity background value $V_0$ is 3180-4675 m/s, with an average value of 3934 m/s, the distribution range width of the acoustic velocity background value $V_0$ is 1495 m/s, the change of effective stress leads to the maximum change of P-wave velocity is about 300 m/s, which is equivalent to ⅕ of the variation amplitude of the acoustic velocity background value $V_0$, it shows that the influence of the change of the acoustic velocity background value $V_0$ on the P-wave velocity is greater than on the effective stress for fine-grained hybrid sedimentary rocks with complex lithology, frequent changes in mineral composition, strong heterogeneity of physical properties, pore types and skeleton-supported types, the fixed acoustic velocity background value $V_0$ is used to calculate the formation pressure will introduce immeasurable errors.

Figure 6:
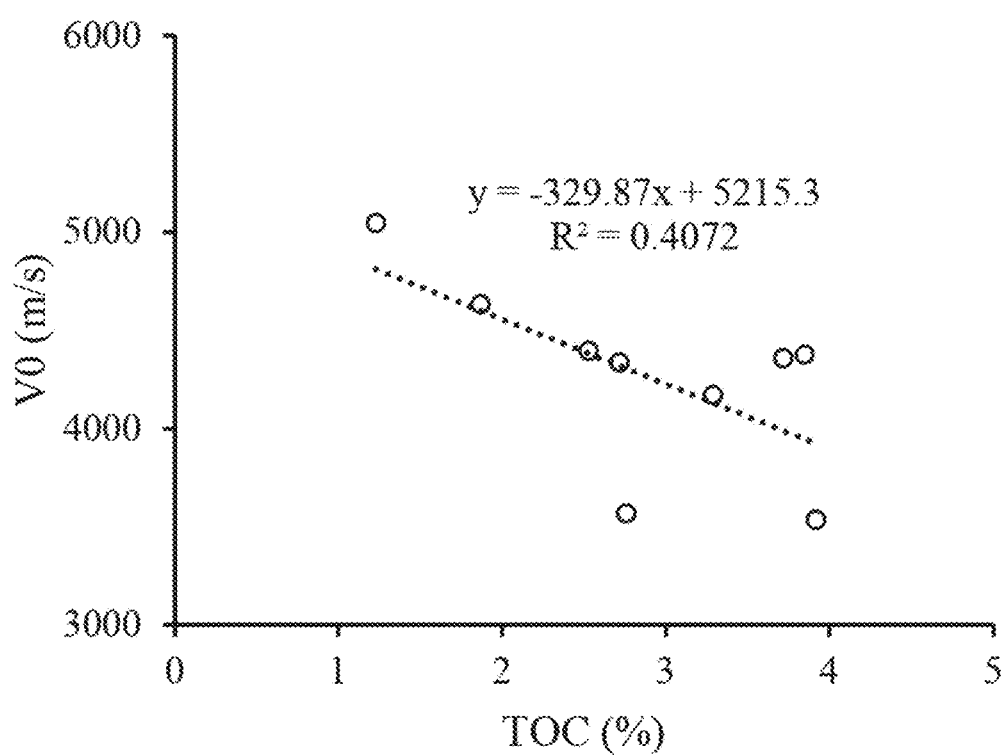
FIG. 6 is a schematic diagram of the relationship between an acoustic velocity background value $V_0$ and a TOC content according to an embodiment of the present invention.
Figure 7:
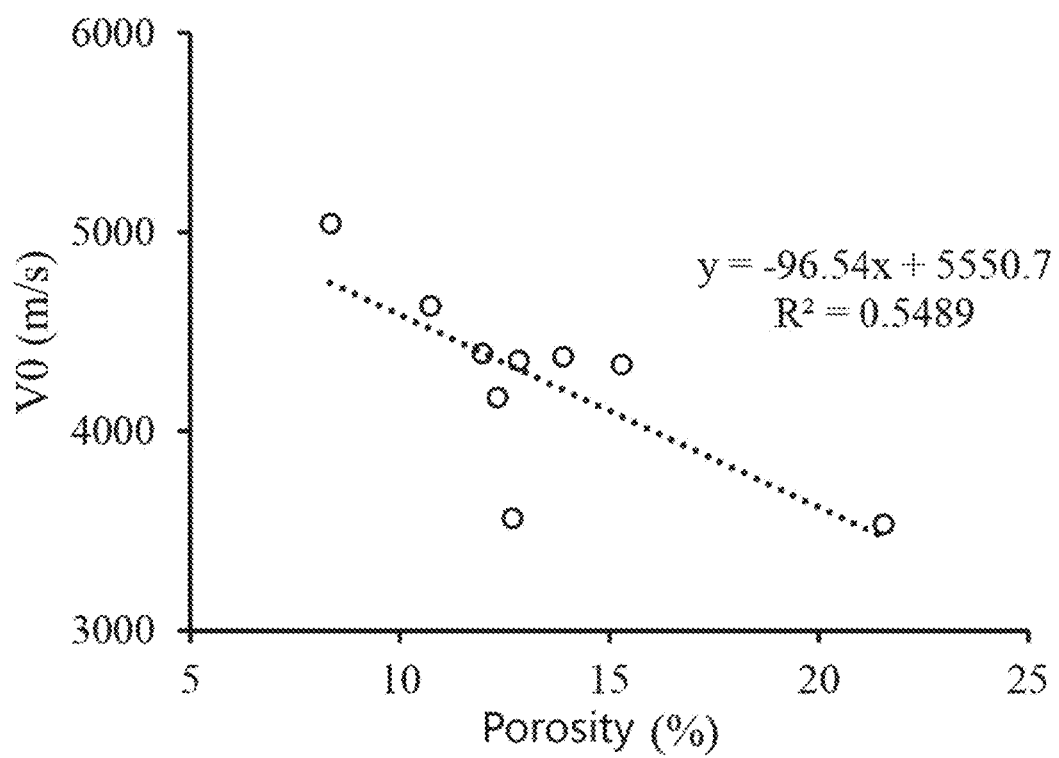
FIG. 7 is a schematic diagram of the relationship between an acoustic velocity background value $V_0$ and a porosity content according to an embodiment of the present invention.
Figure 8:
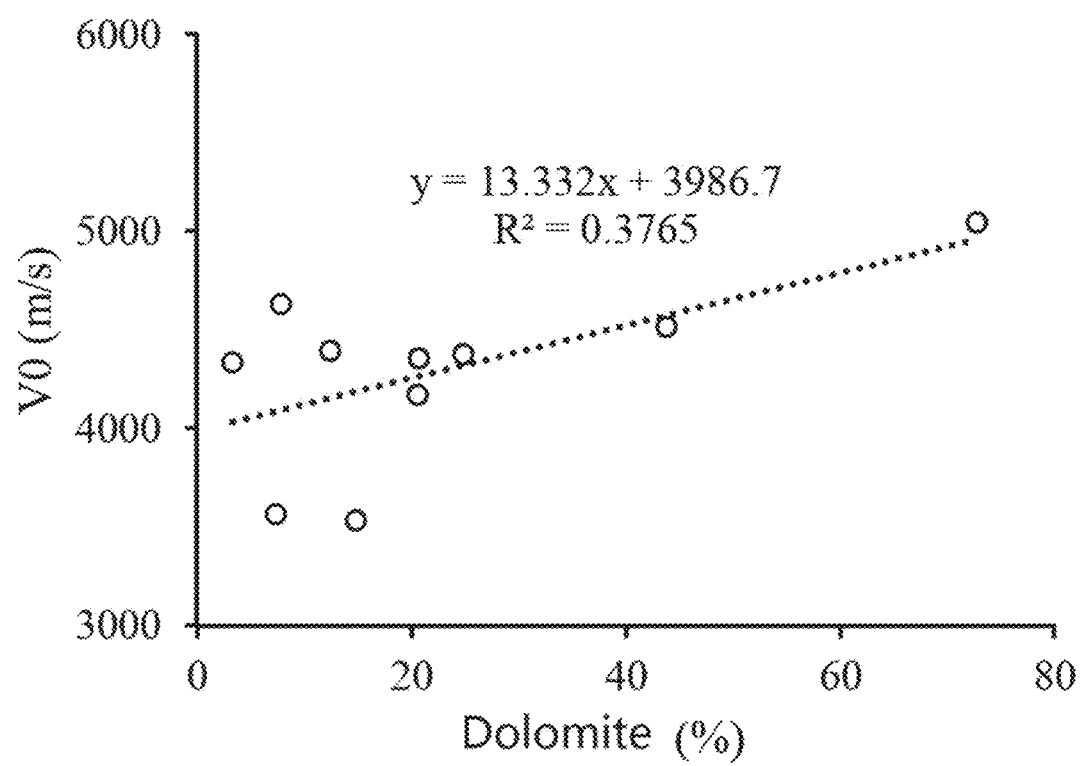
FIG. 8 is a schematic diagram of the relationship between an acoustic velocity background value $V_0$ and a dolomite content according to an embodiment of the present invention.

On the whole, the acoustic velocity background value $V_0$ is negatively correlated with TOC and porosity, and is proportional to dolomite (as shown in FIG. 6, FIG. 7, and FIG. 8). The research of the former has indicated that dolomite, TOC, and porosity can be calculated by logging curves, but in order to improve the accuracy of $V_0$ calculation and simplify the intermediate steps, the logging curve is directly used to predict $V_0$. The specific steps are as follows:

1) 12 measured formation pressure data are sorted out, and combined with the overburden pressure G, the effective stress $\sigma$ of the corresponding depth point is obtained respectively; specifically, the overburden pressure G is calculated by the product of overburden density, gravity acceleration and buried depth; the effective stress value of rock at depth point $\sigma = G - P_p$ is calculated;

2) according to the effective stress influence term model F(σ), the effective stress influence term is calculated, and combined with the P-wave velocity Vp; specifically, the P-wave velocity Vp is the reciprocal of the acoustic logging curve DT, that is, the P-wave velocity Vp=1/DT; and reverse calculation of P-wave velocity background value $V_0$=Vp–F (σ);

3) the relationship between $V_0$ and neutron curve, density curve, acoustic logging curve, resistivity curve, natural gamma ray curve and buried depth parameter of 12 measured formation pressure points is analyzed, and the $V_0$ prediction model is optimized; through analysis, it is found that $V_0$ has the best relationship with the acoustic logging, density and buried depth, the logging evaluation model F(DT, DEN, h, . . . ) of the background value $V_0$ of the P-wave velocity in the fine-grained hybrid sedimentary rock formation is obtained by linear regression in the stratified section:

upper sweet spot $V_0$ prediction model: $V_0$=–45.4*DT+ 533.5*DEN–0.092*h+6327.429;

lower sweet spot $V_0$ prediction model: $V_0$=–52.38*DT+ 287.28*DEDN–0.131*h+7533.38;

where $V_0$ is an acoustic velocity background value, m/s; DT is an acoustic logging curve, μs/m; DEN is a density curve, g/cm³; h is a buried depth, m.

Figure 9:
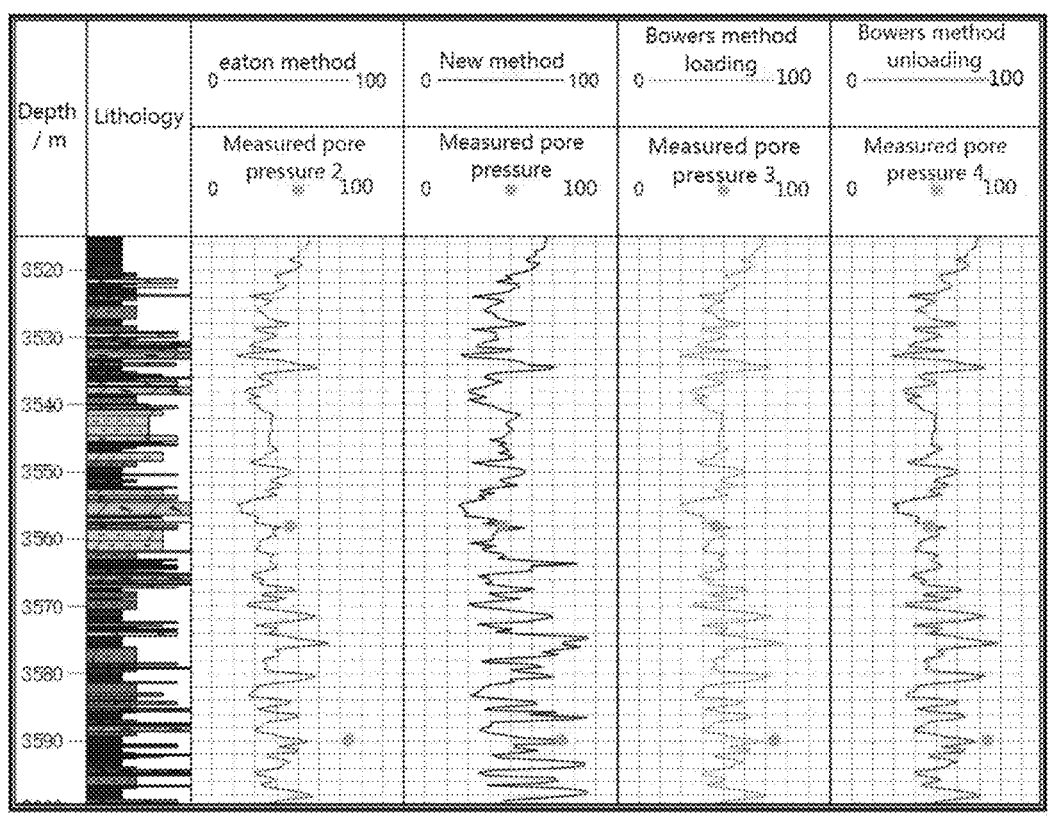
FIG. 9 is a comparison diagram of pore pressure prediction results of well X according to an embodiment of the present invention.

(4) The pore pressure of a variable acoustic velocity background value is predicted;

the DT and DEN logging curves are input, the P-wave velocity background value can be calculated according to the upper sweet spot $V_0$ prediction model or the lower sweet spot $V_0$ prediction model, and then combined with the P-wave velocity Vp, the effective stress influence term f(σ) can be calculated, combined with the effective stress influence term function $f_1(σ)$ or $f_2(σ)$, the effective stress of a certain depth point can be reversely calculated, and the pore pressure can be calculated, as shown below; a continuous pore pressure distribution curve can be obtained by inputting continuous acoustic logging and density curves.

the pore pressure: $Pp=G-\sigma=\rho gh-\sigma$ (3)

$$f(\sigma) = V_p - V_0 = \frac{10^6}{DT} - F(DT, DEN, h, ... ) \quad (4)$$

the effective stress influence term:

where Pp is a pore pressure, MPa; G is an overburden pressure, MPa; ρ is a density of overlying formation, g/cm³; h is a buried depth, km; σ is effective stress, MPa, which is calculated by f (c) function inversion; Vp is a P-wave velocity, m/s, which is calculated by the acoustic logging curve DT; DT is an acoustic logging curve, μs/m; F (DT, DEN, h, . . . ) denotes an acoustic velocity background value function; DEN is a density curve. FIG. 9 is a comparison diagram of pore pressure prediction results of well X according to an embodiment of the present invention.

Embodiment 4

A computer device, the computer device includes memory and a processor, the memory stores a computer program, and the processor executes the computer program to implement steps of the pore pressure prediction method for fine-grained hybrid sedimentary rock based on variable P-wave velocity according to any one of embodiments 1-3.

Embodiment 5

A computer-readable storage medium, a computer program is stored on the computer-readable storage medium, steps of the pore pressure prediction method for fine-grained hybrid sedimentary rock based on variable P-wave velocity according to any one of embodiments 1-3 are implemented when the computer program is executed by the processor.

Embodiment 6

A pore pressure prediction system for fine-grained hybrid sedimentary rock based on variable P-wave velocity, including:

a determining module for the functional relationship between the P-wave velocity and the effective stress is configured as: the functional relationship between the P-wave velocity Vp and the effective stress σ is determined;

an establishment module for the effective stress influence term prediction model is configured as: the effective stress influence term prediction model f(σ) is established;

an establishment module for logging evaluation model of P-wave background value is configured as: the logging evaluation model of acoustic velocity background value $V_0$ is established;

a prediction module is configured as: the pore pressure of the variable acoustic velocity background value is predicted.

What is claimed is:

1. A pore pressure prediction method for a fine-grained hybrid sedimentary rock based on variable P-wave velocity, comprising:

determining a functional relationship between a variable P-wave velocity and effective stress;

establishing an effective stress influence term prediction model, comprising:

based on measured data of a P-wave velocity and an effective stress of core, using an optimization method to predict parameters A and B in a power function and parameters A, B, C, D, and E in the power function+S function respectively by dividing the fine-grained hybrid sedimentary rock into a mud-grade hybrid sedimentary rock and a sand-grade hybrid sedimentary reservoir, and obtaining effective stress influence term function $f_1(σ)$ and $f_2(σ)$ of the mud-grade hybrid sedimentary rock and the sand-grade hybrid sedimentary reservoir respectively;

power function+S function is shown in Equation (1):

$Vp=V_0+A\sigma^B+c/(1+(D/\sigma)^E)=V_0+f_2(\sigma)$ (1)

for the mud-grade hybrid sedimentary rock, the function relationship between the P-wave velocity and the effective stress is denoted by a power function; the power function is shown in Equation (2):

$Vp=V_0+A\sigma^B=V_0+f_1(\sigma)$ (2)

where, Vp is a P-wave velocity of rock, m/s; $V_0$ is an acoustic velocity background value, m/s; σ is the effective stress, MPa; A, B, C, D, and E are parameter variables, the parameter variables A, B, C, D, and E are obtained by a fitting; $f_1$ and $f_2$ are effective stress influence items of the mud-grade hybrid sedimentary rock and the sand-grade hybrid sedimentary reservoir, respectively;

establishing a logging evaluation model of a P-wave background value; comprising:
  combining with measured pore pressure data of a fine-grained hybrid sedimentary rock formation in a work area to calculate an effective stress influence term value, then, deducing a P-wave velocity background value by using an acoustic logging curve of the measured pore pressure corresponding to a depth point; counting a relationship between the P-wave velocity background value and a neutron curve, a density curve, an acoustic logging curve, a resistivity curve, a natural gamma ray curve, and a buried depth, and establishing a logging evaluation model of the acoustic velocity background value; and
predicting a pore pressure of a variable acoustic velocity background value; comprising:
  based on the acoustic velocity background value $V_0$ and the effective stress influence term function $f_1(\sigma)$ or $f_2(\sigma)$, combined with a lithology logging identification method, calculating an effective stress value of a target layer by using the neutron curve, the density curve, the acoustic logging curve, the resistivity curve, the natural gamma ray curve and the buried depth, and then obtaining a pore pressure distribution curve, depicting a vertical and planar distribution of the pore pressure, and realizing a prediction of the pore pressure with the variable acoustic velocity background value, wherein the function relationship between the P-wave velocity and the effective stress is determined by:
  carrying out a core sampling of the fine-grained hybrid sedimentary rock formation, and carrying out effective stress and P-wave velocity tests to measure a change of the P-wave velocity of rock under different effective stresses, analyzing the functional relationship between the P-wave velocity and the effective stress according to an intersection diagram of the P-wave velocity and the effective stress, and determining a functional relationship for two types of reservoirs, comprising the mud-grade hybrid sedimentary rock and the sand-grade hybrid sedimentary reservoir respectively; and
  sampling the fine-grained hybrid sedimentary rock in a study area when the effective stress and P-wave velocity tests are carried out, a sample covers a main lithology, and the sample is a regular cylinder; carrying out the P-wave velocity test on the sample under different effective stresses, and establishing a change curve of the P-wave velocity of the rock with the effective stress, and setting an effective stress point uniformly.

2. The pore pressure prediction method according to claim 1, wherein when the functional relationship between the P-wave velocity and the effective stress is determined, a scatter diagram of a change of the acoustic velocity of each sample with the effective stress is counted respectively, and the relationship between the P-wave velocity and the effective stress of different lithologic samples is observed;
  for the sand-grade hybrid sedimentary reservoir, the function relationship between the P-wave velocity and the effective stress is fitted by power function+S function.

3. The pore pressure prediction method according to claim 1, wherein when the acoustic velocity background value is determined based on a measured formation pressure, according to existing pore pressure test data Pp of a target layer in the work area, and combined with a density of an overlying formation and the buried depth, an overburden pressure G is calculated, and an effective stress value of the rock at a depth point $\sigma=G-Pp$ is calculated;
  $f_1(\sigma)$ or $f_2(\sigma)$, is selected to calculate the effective stress influence term value according to lithology information corresponding to the depth point; and
  combined with a measured acoustic logging curve DT at the depth point, the P-wave velocity Vp is calculated, and the acoustic velocity background value $Vo=Vp-f_1(\sigma)$, or $Vo=Vp-f_2(\sigma)$, is obtained.

4. The pore pressure prediction method according to claim 1, wherein when the logging evaluation model of the P-wave velocity background value is established, according to the acoustic velocity background value Vo, logging curve values corresponding to formation pore pressure test points are extracted, comprising the neutron curve, the density curve, the acoustic logging curve, the resistivity curve, the natural gamma ray curve and the buried depth, through a data correlation analysis method, a correlation coefficient and a correlation degree of the acoustic velocity background value Vo with the buried depth and different logging curves comprising the neutron curve, the density curve, the acoustic logging curve, the resistivity curve and the natural gamma ray curve are analyzed, a parameter combination with a correlation coefficient of the acoustic velocity background value Vo higher than 0.5 and a smaller correlation degree is selected as a sensitive parameter combination, the acoustic velocity background value Vo is taken as a dependent variable, and selected sensitive parameters are as independent variables, and the logging evaluation model F(Vo) of the acoustic velocity background value Vo is established by a linear regression method.

5. The pore pressure prediction method according to claim 4, wherein when the pore pressure of the variable acoustic velocity background value is predicted, the P-wave velocity Vp and the overburden pressure G are calculated by inputting the existing logging curves comprising the neutron curve, the density curve, the resistivity curve and the acoustic logging curve, and an effective stress $\sigma$ of a formation is calculated by the logging evaluation model F(Vo) and an effective stress influence term model of the acoustic velocity background value Vo, and then a pore pressure curve Pp is obtained;
  the pore pressure is shown in Equation (3):
  $$Pp=G-\sigma=\mu gh-\sigma \qquad (3)$$
  the effective stress influence term is shown in Equation (4):
  $$f(\sigma)=V_P-V_0=10^6/DT-F(DT,DEN,h,\ldots) \qquad (4)$$
where Pp is the pore pressure, MPa; G is the overburden pressure, MPa; $\rho$ is a density of the overlying formation, g/cm$^3$; h is the buried depth, km; $\sigma$ is the effective stress, MPa, the effective stress $\sigma$ is calculated by f (o) function inversion; Vp is the P-wave velocity, m/s, the P-wave velocity Vp is calculated by the acoustic logging curve DT; DT is the acoustic logging curve, μs/m; F (DT, DEN, h, . . . ) denotes an acoustic velocity background value function; and DEN is a density curve, wherein g is gravitational acceleration and has a value of 32.2 ft.s$^2$.

* * * * *